Feb. 10, 1925.
L. J. BAKER
1,525,563
COIL MOUNTING
Filed April 21, 1924
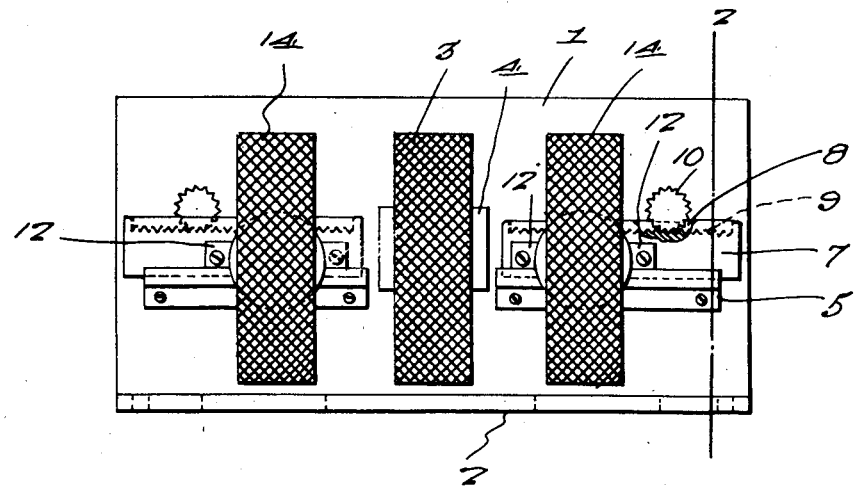
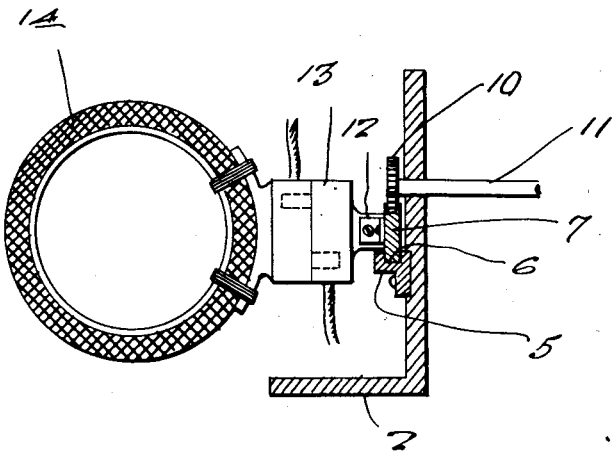
Inventor
L. J. Baker
By Clarence A. O'Brien
Attorney Patented Feb. 10, 1925.

1,525,563

UNITED STATES PATENT OFFICE.

LAWRENCE J. BAKER, OF KANSAS CITY, KANSAS.

COIL MOUNTING.

Application filed April 21, 1924. Serial No. 708,037.

*To all whom it may concern:*

Be it known that I, LAWRENCE J. BAKER, a citizen of the United States, residing at Kansas City, in the county of Wyandotte and State of Kansas, have invented certain new and useful Improvements in Coil Mountings, of which the following is a specification.

This invention relates to coil mountings, and more particularly to means for mounting the relatively removable honeycomb coils of radio receiving sets, so that they are axially movable with respect to the stationary coils.

An object of the invention resides in providing means for mounting honeycomb coils of radio receiving sets, including a panel adapted to mount the stationary coil in the central portion thereof, said panel provided with bar members slidable along one face thereof and at each side of the stationary coil mounting, adapted to mount the movable coil, and operating means being provided for sliding said members relative to the panel for moving the movable honeycomb coils relative to the stationary coil, so that they will at all times maintain a fixed axial relation with respect to one another.

Another object of the invention resides in providing a coil mounting including a panel, having a bracket mounted in the central portion thereof adapted to receive the stationary coil, guide and supporting members being positioned at opposite sides of the central bracket, adapted to slidably receive bar members formed with longitudinally extending recesses provided with racks in the bottoms thereof adapted to cooperate with pinions mounted in the panels for effecting the sliding movement of said bar members in the guides, said bar members being provided with brackets for mounting the movable coil members so that the movable coils will be adjusted in the operation of the radio sets for tuning purposes, in axial alignment with each other and said stationary coils, in order to provide for a maximum inductive efficiency between the several coils.

The invention also includes other objects and improvements in the details of construction and mounting of the parts, for carrying out the features of the invention, which are more particularly pointed out in the following description and claims, directed to a preferred form of the invention, it being understood, however, that various other means may be employed in the mounting and operation of these coils, to effect the axial movement thereof, within the scope and spirit of this invention, as described and claimed.

In the drawings, forming a part of this application:

Figure 1 is a rear elevational view of a panel, having the improved coil mounting connected therewith, showing the coils in their proper positions of adjustment.

Figure 2 is a sectional view, taken on the line 2—2 of Figure 1.

1 indicates a panel having a base flange 2 extending substantially at right angles therefrom, adapted to provide a portion for receiving mounting elements adapted to mount the panel in a suitable radio set. A stationary honeycomb coil is indicated at 3, mounted on a suitable bracket 4, carried by the central portion of the panel 1, while guide brackets are indicated at 5, and mounted at opposite sides of the bracket 4 and the stationary coil, on the rear face of the panel 1. These guide members 4 are channelled longitudinally of the upper edge thereof as indicated at 6, for slidably receiving and guiding bar members 7, while the bottom of the guide members are formed with depending flanges for receiving the securing screws adapted to mount the guide members on the panel 1.

The bar members 7 are formed with recesses in the upper edge thereof, indicated at 8, which terminate adjacent the ends of each bar member, the bottoms of the recess being formed with rack teeth 9, for intermeshing cooperation with pinions 10, mounted on a shaft 11, rotatable in the panel 1, and operable in any suitable manner, for sliding the bar members in the guide members 5. The ends of the bar member adjacent the recess portion 8 are adapted to engage the pinions 10 and form stops to limit the movement of the bar members 7, in order that a disconnection from the pinions be prevented, while the side portions forming the recess are adapted to engage the faces of the pinions and cooperate with the guide brackets 5 for retaining the bar members in slidable cooperation therewith. Each of the bar members 7 have cooperating brackets 12 mounted thereon for receiving and mounting therebetween the terminal blocks 13 of each of the removable honeycomb coils 14, so that when said honeycomb coils are mounted on said bar members, they will be arranged in axial alignment with respect to the stationary coils 3.

In the adjustment of these movable coils 14 relative to the stationary coil 3, it will be seen that the rotation of the shaft 11 will effect an operation of the pinion 10, for sliding the bars 7 in the guides 5, in order to move the movable coils 14 relative to the stationary coil, which will be in an axial relation thereto, so that an adjustment of the movable coils is had, for maintaining a predetermined relation between the movable and stationary coils wherein a maximum inductive effect between the coils will result. That is, the center or axis of the magnetic lines of force of each coil will be centered relative to one another, in all positions of adjustment of the coils, in order to maintain the best results in the use of honeycomb coils.

What is claimed is:

1. Means for mounting relatively movable coils for movement in axial alignment, comprising a panel, bracket members mounted on said panel in aligned relation, bar members slidable in said bracket members formed with recesses in the upper edge thereof having rack teeth arranged in the bottom of the recess, shafts rotatably mounted in spaced relation above each of said bracket members, pinions mounted on said shafts for rotation therewith, seated in the recesses in said bar members, and intermeshed with the rack teeth thereof, and bracket members carried by said bar members for receiving and mounting said coils, for producing a relatively axial movement thereof in the sliding movement of the bar members effected in the rotation of said pinions, said pinions cooperating with the bracket members for retaining the bar members in slidable engagement therewith.

2. Means for mounting relatively movable coils for movement in axial alignment, comprising a panel, bracket members mounted on said panel in alignment, said bracket members being channelled along the upper edge thereof in aligned relation, bar members slidably mounted in the channels of said brackets and formed with recessed upper edge portions having rack teeth provided at the bottom of said recesses, shafts rotatably mounted in said panel, in spaced relation with each guide member, pinions mounted on said shafts for rotation therewith seating in the recesses in said bar members and intermeshing with the rack teeth thereof, adapted in the rotation thereof to produce a sliding movement of the bar members in said guide brackets, said pinions engaging the walls of the recess in said bar member and cooperating therewith and the bracket members for retaining said bar members in aligned slidable relation, in said bracket members, and cooperating brackets carried by the bar members for mounting the coils, whereby the movement of the bar members in said bracket members will produce a relative axial movement of said coils.

In testimony whereof I affix my signature.

LAWRENCE J. BAKER.